United States Patent
Berger et al.

(10) Patent No.: US 10,482,510 B2
(45) Date of Patent: *Nov. 19, 2019

(54) SYSTEM, METHOD AND COMPUTER PROGRAM PRODUCT FOR TRACKING AND CORRELATING ONLINE USER ACTIVITIES WITH SALES OF PHYSICAL GOODS

(71) Applicant: Truecar, Inc., Santa Monica, CA (US)

(72) Inventors: James Francis Berger, Los Angeles, CA (US); Jacob Michael LaCivita, Los Angeles, CA (US); James Thai Nguyen, Palos Verdes Estates, CA (US); Meghashyam Grama Ramanuja, Santa Monica, CA (US); Michael D. Swinson, Santa Monica, CA (US); Thomas Taira, Berkeley, CA (US)

(73) Assignee: TrueCar, Inc., Santa Monica, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/707,403

(22) Filed: Sep. 18, 2017

(65) Prior Publication Data

US 2018/0025398 A1 Jan. 25, 2018

Related U.S. Application Data

(63) Continuation of application No. 14/137,178, filed on Dec. 20, 2013, now Pat. No. 9,811,847.
(Continued)

(51) Int. Cl.
G06Q 30/06 (2012.01)
G06Q 30/02 (2012.01)

(52) U.S. Cl.
CPC ......... *G06Q 30/06* (2013.01); *G06Q 30/0214* (2013.01)

(58) Field of Classification Search
None
See application file for complete search history.

(56) References Cited

U.S. PATENT DOCUMENTS 5,774,873 A 6/1998 Berent et al.
5,842,178 A 11/1998 Givannoli
(Continued)

FOREIGN PATENT DOCUMENTS

CN 1386236 12/2002
JP 06119309 4/1994
(Continued)

OTHER PUBLICATIONS

Office Action issued for Canadian Patent Application No. 2,837,454, dated Apr. 12, 2018, 7 pages.
(Continued)

*Primary Examiner* — Fateh M Obaid
(74) *Attorney, Agent, or Firm* — Sprinkle IP Law Group

(57) ABSTRACT

A vehicle sales matching system may include a vehicle sales lead data database, a vehicle sales information database, and a sales matching system embodied on a non-transitory computer readable medium and communicatively connected to the vehicle sales lead data database and the vehicle sales information database. The vehicle sales lead data may include validated customer data and third party customer data. The vehicle sales information may include sales data from vehicle dealers, data extract services, and sales data sources. The sales matching system may be configured for applying one or more matching rules for matching a vehicle sales lead from the vehicle sales lead database to a vehicle sale from the vehicle sales information database.

20 Claims, 5 Drawing Sheets

Related U.S. Application Data

(60) Provisional application No. 61/745,191, filed on Dec. 21, 2012.

(56) References Cited

U.S. PATENT DOCUMENTS

| | | | |
|---|---|---|---|
| 6,006,201 A | 12/1999 | Berent et al. | |
| 6,029,141 A | 2/2000 | Bezos et al. | |
| 6,041,310 A | 3/2000 | Green | |
| 6,836,773 B2 | 12/2004 | Tamayo et al. | |
| 6,868,389 B1 | 3/2005 | Wilkins | |
| 6,882,983 B2 | 4/2005 | Furphy et al. | |
| 6,892,185 B1 | 5/2005 | Van Etten et al. | |
| 7,050,982 B2 | 5/2006 | Sheinson | |
| 7,219,080 B1 | 5/2007 | Wagoner et al. | |
| 7,392,224 B1 | 6/2008 | Bauer et al. | |
| 7,546,243 B2 | 6/2009 | Kapadia et al. | |
| 7,596,501 B2 | 9/2009 | Tivey et al. | |
| 7,596,509 B1* | 9/2009 | Bryson | G06Q 30/06 705/27.2 |
| 7,599,842 B2 | 10/2009 | Tivey et al. | |
| 7,624,065 B2 | 11/2009 | Schoen et al. | |
| 7,676,400 B1 | 3/2010 | Dillon | |
| 7,747,474 B2 | 6/2010 | Miloslavsky et al. | |
| 7,801,798 B1 | 9/2010 | Huemer et al. | |
| 7,818,201 B2 | 10/2010 | Shevlin et al. | |
| 7,835,982 B2 | 11/2010 | Schoen et al. | |
| 7,921,052 B2 | 4/2011 | Dabney et al. | |
| 8,000,989 B1 | 8/2011 | Kiefhaber et al. | |
| 8,078,515 B2 | 12/2011 | John | |
| 8,112,325 B2 | 2/2012 | Foy et al. | |
| 8,126,881 B1 | 2/2012 | Sethi et al. | |
| 8,230,362 B2 | 7/2012 | Couch | |
| 8,326,845 B2 | 12/2012 | Sethi et al. | |
| 8,375,037 B2 | 2/2013 | Sethi et al. | |
| 8,429,220 B2 | 4/2013 | Wilkinson et al. | |
| 8,515,817 B2 | 8/2013 | Noy et al. | |
| 8,521,619 B2 | 8/2013 | Perry, III et al. | |
| 8,538,828 B2 | 9/2013 | Skutta | |
| 8,589,212 B2 | 11/2013 | Pollak et al. | |
| 8,589,250 B2 | 11/2013 | Noy | |
| 8,595,082 B2 | 11/2013 | Skutta | |
| 8,818,881 B2 | 8/2014 | Himmerick et al. | |
| 8,868,480 B2 | 10/2014 | McBride et al. | |
| 8,868,572 B2 | 10/2014 | Sethi et al. | |
| 9,103,743 B2 | 8/2015 | Couch | |
| 9,104,718 B1 | 8/2015 | Levy et al. | |
| 9,189,800 B2 | 11/2015 | McBride | |
| 9,189,960 B2 | 11/2015 | Couch et al. | |
| 9,324,104 B1 | 4/2016 | Levy et al. | |
| 9,347,758 B2 | 5/2016 | Berent et al. | |
| D765,089 S | 8/2016 | Agee | |
| 9,412,203 B1 | 8/2016 | Garcia, III et al. | |
| 9,465,873 B1 | 10/2016 | Franke et al. | |
| 9,466,079 B2 | 10/2016 | Hygema et al. | |
| D774,523 S | 12/2016 | Agee | |
| D774,524 S | 12/2016 | Agee | |
| 9,600,822 B2 | 3/2017 | Pyle et al. | |
| 9,811,847 B2 | 11/2017 | Berger et al. | |
| 2001/0037205 A1 | 11/2001 | Joao | |
| 2001/0037265 A1 | 11/2001 | Kleinberg | |
| 2002/0082978 A1* | 6/2002 | Ghouri | G06Q 30/08 705/37 |
| 2002/0111856 A1 | 8/2002 | Messer et al. | |
| 2002/0147625 A1 | 10/2002 | Kolke, Jr. | |
| 2003/0105728 A1 | 6/2003 | Yano et al. | |
| 2003/0171964 A1 | 9/2003 | Center | |
| 2003/0200156 A1 | 10/2003 | Roseman et al. | |
| 2003/0229577 A1 | 12/2003 | Nabel | |
| 2004/0014454 A1 | 1/2004 | Burgess | |
| 2004/0143473 A1 | 7/2004 | Tivey et al. | |
| 2004/0143476 A1 | 7/2004 | Kapadia et al. | |
| 2004/0143482 A1 | 7/2004 | Tivey et al. | |
| 2005/0108112 A1 | 5/2005 | Ellenson | |
| 2005/0159996 A1 | 7/2005 | Lazarus et al. | |
| 2005/0171859 A1 | 8/2005 | Harrington | |
| 2005/0209934 A1 | 9/2005 | Irby et al. | |
| 2005/0234688 A1 | 10/2005 | Pinto et al. | |
| 2005/0261951 A1 | 11/2005 | Tighe | |
| 2006/0085283 A1 | 4/2006 | Griffiths | |
| 2006/0106668 A1 | 5/2006 | Kim et al. | |
| 2006/0129423 A1 | 6/2006 | Sheinson | |
| 2006/0178973 A1 | 8/2006 | Chiovari et al. | |
| 2006/0200360 A1 | 9/2006 | Razletovskiy | |
| 2006/0212355 A1 | 9/2006 | Teague et al. | |
| 2007/0112582 A1 | 5/2007 | Fenlon | |
| 2007/0130090 A1 | 6/2007 | Staib et al. | |
| 2007/0143345 A1 | 6/2007 | Jones et al. | |
| 2007/0185777 A1 | 8/2007 | Pyle et al. | |
| 2007/0219851 A1 | 9/2007 | Taddei et al. | |
| 2007/0226081 A1 | 9/2007 | Vilcauskas | |
| 2007/0244797 A1* | 10/2007 | Hinson | G06Q 30/08 705/37 |
| 2008/0091443 A1 | 4/2008 | Strope et al. | |
| 2008/0201203 A1 | 8/2008 | Rose et al. | |
| 2008/0255965 A1 | 10/2008 | Milton | |
| 2008/0288361 A1 | 11/2008 | Rego et al. | |
| 2008/0300962 A1 | 12/2008 | Cawston | |
| 2008/0306812 A1 | 12/2008 | Bowen et al. | |
| 2008/0306848 A1 | 12/2008 | Bartholomew | |
| 2009/0006118 A1 | 1/2009 | Pollak | |
| 2009/0006159 A1* | 1/2009 | Mohr | G06Q 10/00 705/7.13 |
| 2009/0018888 A1 | 1/2009 | Zamani | |
| 2009/0037356 A1 | 2/2009 | Rothstein et al. | |
| 2009/0048859 A1 | 2/2009 | McCarthy et al. | |
| 2009/0089149 A1 | 4/2009 | Lerner et al. | |
| 2009/0164338 A1 | 6/2009 | Rothman | |
| 2009/0254454 A1 | 10/2009 | Gupta | |
| 2009/0271246 A1 | 10/2009 | Alvarez et al. | |
| 2009/0276291 A1 | 11/2009 | Wannier et al. | |
| 2009/0287534 A1 | 11/2009 | Guo et al. | |
| 2009/0287595 A1 | 11/2009 | Hanifi | |
| 2010/0070382 A1* | 3/2010 | Inghelbrecht | G06Q 10/067 705/26.1 |
| 2010/0088158 A1 | 4/2010 | Pollak | |
| 2010/0153184 A1 | 6/2010 | Caffrey et al. | |
| 2010/0161379 A1 | 6/2010 | Bene et al. | |
| 2010/0161408 A1 | 6/2010 | Karson et al. | |
| 2010/0183132 A1 | 7/2010 | Satyavolu et al. | |
| 2010/0274571 A1 | 10/2010 | McFall et al. | |
| 2010/0274631 A1 | 10/2010 | McFall et al. | |
| 2010/0293070 A1 | 11/2010 | Kopelman et al. | |
| 2011/0131652 A1 | 6/2011 | Robinson et al. | |
| 2011/0178863 A1 | 7/2011 | Daigle | |
| 2011/0191264 A1 | 8/2011 | Inghelbrecht | |
| 2011/0202471 A1 | 8/2011 | Scott et al. | |
| 2012/0005070 A1 | 1/2012 | McFall et al. | |
| 2012/0179476 A1 | 7/2012 | Muncy | |
| 2012/0233014 A1 | 9/2012 | Banks et al. | |
| 2012/0284087 A1 | 11/2012 | Pollak | |
| 2012/0284113 A1 | 11/2012 | Pollak | |
| 2013/0191247 A1 | 7/2013 | Huang et al. | |
| 2013/0311341 A1 | 11/2013 | Noy et al. | |
| 2013/0339173 A1 | 12/2013 | Skutta | |
| 2014/0032352 A1 | 1/2014 | Fraser et al. | |
| 2014/0032353 A1 | 1/2014 | Fraser et al. | |
| 2014/0067615 A1 | 3/2014 | Park et al. | |
| 2014/0089208 A1 | 3/2014 | Humble et al. | |
| 2014/0180882 A1* | 6/2014 | Berger | G06Q 30/06 705/30 |
| 2014/0229391 A1 | 8/2014 | East, III et al. | |
| 2014/0257934 A1 | 9/2014 | Chrzan et al. | |
| 2014/0258044 A1 | 9/2014 | Chrzan et al. | |
| 2014/0278806 A1 | 9/2014 | Duguid et al. | |
| 2014/0279020 A1 | 9/2014 | Duguid et al. | |
| 2014/0279171 A1 | 9/2014 | Burgiss et al. | |
| 2014/0279229 A1 | 9/2014 | Burgiss et al. | |
| 2014/0279275 A1 | 9/2014 | Burgiss et al. | |
| 2014/0351074 A1 | 11/2014 | Enge et al. | |
| 2015/0058152 A1 | 2/2015 | Pollak et al. | |
| 2015/0206206 A1 | 7/2015 | Puente et al. | |
| 2015/0220876 A1 | 8/2015 | Sethi et al. | |
| 2015/0324737 A1 | 11/2015 | Chrzan et al. | |

(56) References Cited

U.S. PATENT DOCUMENTS

| | | |
|---|---|---|
| 2015/0324879 A1 | 11/2015 | Lu et al. |
| 2015/0356672 A1 | 12/2015 | Humble et al. |
| 2015/0363855 A1* | 12/2015 | Wu .................... G06O 30/0621 705/26.5 |
| 2016/0034999 A1 | 2/2016 | McBride |
| 2016/0343058 A1 | 11/2016 | Levy et al. |
| 2016/0364783 A1* | 12/2016 | Ramanuja .......... G06Q 30/0631 |
| 2016/0371323 A1 | 12/2016 | Garcia, III et al. |

FOREIGN PATENT DOCUMENTS

| | | |
|---|---|---|
| JP | 2002074096 | 3/2002 |
| JP | 2003157361 | 5/2003 |
| JP | 2003216869 | 7/2003 |
| JP | 2012502375 | 1/2012 |
| WO | WO200140898 A2 | 6/2001 |
| WO | WO200140898 A3 | 11/2007 |
| WO | WO2010030632 | 3/2010 |
| WO | WO2010030633 | 3/2010 |

OTHER PUBLICATIONS

Jacobs, et al., "Operations and Supply Management", <<http://highered.mheducation.com/sites/dl/free/0070700893/572707/Chap17.ppt>>, Dec. 31, 2009, 43 pages.
Office Action issued for European Patent Application No. 13864928.0, dated Jul. 12, 2018, 7 pages.
Buy Qualified, Targeted Leads, askaprice.com, retrieved from <http://partner.askaprice.com/buy_leads/>, Oct. 20, 2009, 2 pgs.
Attention New and Used Car Dealers! More Car Leads Equals More Sales, automotiveleads.com, retrieved from <http://www.automotiveleads.com>, Oct. 20, 2009, 2 pgs.
Painter, Scott, "Car Sales Lead Generation: Broken for Consumers, Broken for Dealers," E-Commerce Times, Sep. 15, 2008, retrieved from <http://www.crmbuyer.com/story/64475.html?wlc=1256049248> printed Oct. 20, 2009, 4 pgs.
Office Action for U.S. Appl. No. 12/655,462, dated May 21, 2012, 10 pgs.
International Search Report and Written Opinion for PCT Application No. PCT/US2012/044416, dated Sep. 12, 2012, 11 pgs.
Office Action for U.S. Appl. No. 12/655,462, dated Sep. 11, 2012, 13 pgs.
Office Action for U.S. Appl. No. 12/655,462, dated Dec. 26, 2012, 13 pgs.
Office Action for U.S. Appl. No. 12/655,462, dated Mar. 29, 2013, 14 pgs.
International Preliminary Report on Patentability for PCT Patent Application No. PCT/US2012/044416, dated Jan. 16, 2014, 10 pgs.
Kim, Jae Kyeong et al., A Hybrid Recommendation Procedure for New Items Using Preference Boundary, ICEC '09 Proceedings of the 11th Int'l Conf. on Electronic Commerce, 2009, pp. 289-295.
International Search Report and Written Opinion for PCT Application No. PCT/US2013/076987, dated Apr. 14, 2014, 7 pgs.
Office Action for U.S. Appl. No. 14/137,178, dated Oct. 22, 2014, 8 pgs.
Goldberg, Adam, "Job Security through PPC-CRM Integration", paydigest.com, published Aug. 22, 2007, 2 pgs.
Sauberlich, Frank et al., "Analytical Lead Management in the Automotive Industry," Springerlink Heidelberg Springer Berlin, 2006, pp. 290-299.
Office Action for U.S. Appl. No. 11/968,137, dated Dec. 23, 2010, 8 pgs.
Office Action for U.S. Appl. No. 11/968,137, dated Jun. 9, 2011, 9 pgs.
Office Action for U.S. Appl. No. 11/968,137, dated Dec. 19, 2011, 10 pgs.
Collins, Gregory M., "Technology Opens Up Huge CRM Opportunities for Retailers," Jun. 10, 2002, retrieved from <http://www.destinationcrm.com/Articles/PrintArticle.aspx?ArticleID=47419>, 3 pgs.
Gibbs, Rick, "How Google Base Replaces Autos Classifieds", Nov. 27, 2006, retrieved from <http://www.imediaconnection.com/printpage.aspx?id=12548.asp>, 4 pgs.
No Author, "3 Reasons Why Using Google Pays Off for Automobile Dealers," 2005, retrieved from <http://www.kaistudios.com/PPC/guides/Google-autodealers.htm>, 2 pgs.
Office Action for U.S. Appl. No. 13/942,375, dated Nov. 20, 2013, 12 pgs.
Office Action for U.S. Appl. No. 13/942,375, dated Jun. 12, 2014, 17 pgs.
Office Action in U.S. Appl. No. 13/942,375, dated Oct. 6, 2014, 6 pgs.
International Preliminary Report on Patentability for PCT Application No. PCT/US13/76987, dated Jan. 7, 2015, 22 pgs.
Office Action in U.S. Appl. No. 14/043,242, dated Feb. 26, 2015, 11 pgs.
Office Action issued for U.S. Appl. No. 13/942,375, dated Mar. 18, 2015, 6 pages.
European Search Report issued for European Patent Application No. 12 808 024.9, dated Mar. 26, 2015, 10 pages.
Scott, Steven L., et al., A nested Hidden Markov Model for Internet Browsing Behavior, Marshall School of Business, 2006, pp. 1-26.
Final Office Action issued for U.S. Appl. No. 14/137,178, dated May 26, 2015, 11 pages.
Office Action for U.S. Appl. No. 14/137,178, dated Dec. 30, 2015, 8 pgs.
Office Action issued for Chinese Patent Application No. 201280031793.2, dated May 27, 2016, 25 pages.
Yao Jinfeng et al., "An Anonymous-User-Oriented Purchase Prediction Model Based on Web Usage Mining," Computer Applications and Software, vol. 24, No. 11, Abstract, Nov. 30, 2007, 1 pg.
European Search Report issued for European Patent Application No. 13864928.0, dated May 20, 2016, 9 pages.
Office Action issued for U.S. Appl. No. 14/137,178, dated Jul. 7, 2016, 11 pages.
Office Action issued for Japanese Patent Application No. 2014-518965, dated Jun. 16, 2016, 11 pages.
Examination Report for Canadian Patent Application No. 2,891,934, dated Sep. 27, 2016, 6 pages.
Notice of Allowance issued for Japanese Patent Application No. 2014-518965, dated Oct. 19, 2016, 3 pages.
Examination Report issued for European Patent Application No. 12 808 024.9, dated Dec. 21, 2016, 9 pages.
Office Action issued for Chinese Patent Application No. 201280031793.2, dated Jan. 13, 2017, 19 pages.
Office Action issued for Chinese Patent Application No. 201280031793.2, dated Jun. 23, 2017, 6 pages.
Notice of Allowance issued for Chinese Patent Application No. ZL201280031793.2, dated Oct. 20, 2017, 2 pages.
Notice of Allowance issued for U.S. Appl. No. 14/884,368, dated Mar. 18, 2019, 10 pages.
Office Action issued for Canadian Patent Application No. 2,837,454, dated Feb. 18, 2019, 7 pages.
Notice of Allowance issued for U.S. Appl. No. 14/844,368, dated Jul. 18, 2019, 10 pages.

* cited by examiner

|  | Lead Data | Sale Data | Partner Data |
|---|---|---|---|
| Name | John Smith | Mary Jones | John Smith and Mary Jones |
| Address | 55 Work Address | 123 Home Address | 123 Home Address |
| Phone | 401-555-5555 | 212-555-2222 | 401-555-5555 |
| Email | jsmith@airforce.us.gov | mary@personalmail.com | mary@personalmail.com |
| Make/Model | Ford Explorer | Ford Explorer | Ford Explorer |
| Date | 2/28/2013 | 3/12/2013 | 3/12/2013 |
| Dealer | Zag Ford | Zag Ford | (Null) |
| Unique Partner ID | ASDFJKL | (Null) | ASDFJKL |

MATCHING PARTNER DATA INDICATING SAME PERSON

FIG. 4

| Name | Confidence | | Name | Confidence |
|---|---|---|---|---|
| First/Last/Addr Exact | 105 | | Lead/Dealer | 45 |
| MemberID | 101 | | Exact Last/Dealer | 40 |
| 1st 12 Avs, Dealer | 100 | | Exact Last/VIN | 40 |
| Email-Exact | 95 | | *Fuzzy eMail | 20 |
| ExactLast+Address+Dealer | 70 | | Exact Phone | 15 |
| First/Last/Addr Partial | 65 | | Last/1stCharFirst/PartialPhone/Dealer | 15 |
| First/Last/Zip Exact | 60 | | Exact VIN match | 10 |
| First, Last/Exact, Zip Partial | 50 | | Uncommon Surname | 0 |
| Exact Last/Zip/Dealer | 50 | | Exact Last/Nickname | 0 |
| Exact Address/Dealer | 50 | | EMAIL: same root/different domain | 0 |
| Exact Phone/Zip | 50 | | eMail: UncommonDomainName | 0 |
| Lead/Dealer/Date | 50 | | SearchZip=SaleZip | 0 |
| First/LastNames | 45 | | | |

FIG. 5

| Example | Match Reason | Match Confidence Score |
|---|---|---|
| A | First/Last/Zip Exact; Exact Phone/Zip; Lead/Dealer/Date; Uncommon surname; Same Lead/Sale Make/Model | 160 |
| B | Email-Exact; Lead/Dealer/Date | 145 |
| C | Exact Address/Dealer; Lead/Dealer/Date; Same Lead/Sale Make/Model | 100 |
| D | Lead/Dealer/Date; Exact Phone; Same Lead/Sale Make/Model | 65 |

FIG. 6

SYSTEM, METHOD AND COMPUTER PROGRAM PRODUCT FOR TRACKING AND CORRELATING ONLINE USER ACTIVITIES WITH SALES OF PHYSICAL GOODS

CROSS REFERENCE TO RELATED APPLICATION(S)

This application is a continuation of, and claims a benefit of priority under 35 U.S.C. 120 of the filing date of U.S. patent application Ser. No. 14/137,178, filed Dec. 20, 2013, entitled "SYSTEM, METHOD AND COMPUTER PROGRAM PRODUCT FOR TRACKING AND CORRELATING ONLINE USER ACTIVITIES WITH SALES OF PHYSICAL GOODS," issued as U.S. Pat. No. 9,811,847, which is a conversion of, and claims a benefit of priority under 35 U.S.C. § 119(e) from U.S. Provisional Application No. 61/745,191, filed Dec. 21, 2012, entitled "PAY-PER-SALE SYSTEM, METHOD AND COMPUTER PROGRAM PRODUCT THEREFOR," all of which are fully incorporated herein by reference in their entireties.

TECHNICAL FIELD

This disclosure relates generally to lead generation and sales matching. More particularly, embodiments disclosed herein relate to a methodology, system, and computer program product for tracking and correlating online user activities with sales of physical goods, useful for solving data gap issues.

BACKGROUND

Today, many people and entities alike use the internet for selling and purchasing products or services. A sale may occur online after a lead that identifies a prospective customer has been provided from a lead supplier, where the lead supplier may be a party other than the seller of the product or service. In pay-per-sale models, lead generators are paid on the basis of the number of sales that are directly generated by an advertisement or leads.

In conventional pay-per-sale models, systems may attempt to track a sale of a product by collecting information from dealers of items presented on websites and users browsing such websites. However, with conventional pay-per-sale models, it is impossible to track which sales generated by a dealer correspond to a particular lead, caused by data gaps between the online world where the websites operate and the physical world where the sales took place. In some conventional systems, a lead generator may be paid for a sale of a product or service only if a user submits a lead certificate from the lead generator to a dealer.

To this end, there is a need for improved systems and methods to determine what sales correspond to which leads. Embodiments disclosed herein can address this need and more.

SUMMARY

Embodiments disclosed herein are directed towards a pay-per-sale model and system implementing the pay-per-sale model that may determine if a generated lead is associated with the sale of a product, utilizing customer specific data. The system may include a vehicle sales lead data database, a vehicle sales information database, and a sales matching system embodied on a non-transitory computer readable medium and communicatively connected to the vehicle sales lead data database and the vehicle sales information database.

The vehicle sales lead data may include validated customer data and third party customer data. The vehicle sales information may include sales data from vehicle dealers, third party data extract services, and third party sales data sources. The sales matching system may be configured for applying one or more matching rules for matching a vehicle sales lead from the vehicle sales lead database to a vehicle sale from the vehicle sales information database.

In some embodiments, the vehicle sales lead data database may include lead data input by potential customers at a web site associated with the sales matching system. In some embodiments, validated customer data may include data filtered for consistency. In some embodiments, third party customer data may include data derived from independent sources. In some embodiments, the third party sales data sources including one or more of insurance providers and financing providers. In some embodiments, the sales matching system employing a first threshold for determining whether there is a match and a second threshold for determining whether there is not a match.

A method for matching vehicle sales may include collecting vehicle sales lead data in a vehicle sales lead data database, the vehicle sales lead data including validated customer data and third party customer data; collecting vehicle sales information in a vehicle sales information database, the vehicle sales information including sales data from vehicle dealers, third party data extract services, and third party sales data sources; and applying one or more matching rules for matching a vehicle sales lead from the vehicle sales lead database to a vehicle sale from the vehicle sales information database.

Some embodiments may include a computer program product having at least one non-transitory computer readable medium storing instructions translatable by at least one processor to implement the method.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 depicts an example of household matching.

FIG. 5 depicts example sales matching criteria.

FIG. 6 is an example of automatic vs. manual matching.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions, and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. Embodiments as disclosed herein relate to various systems that are configured to track a user's interaction with a network site (also referred to herein as the TrueCar system). The system is configured to identify a source of where the user entered the network site and the user's interaction with the network site to, for instance, receive pricing information of a desired vehicle configuration. The system may also be configured to generate and track leads, determine if a sale is associated with a lead, and invoice a lead consumer if the sale is matched to the lead and approved for invoicing.

Figure 1:
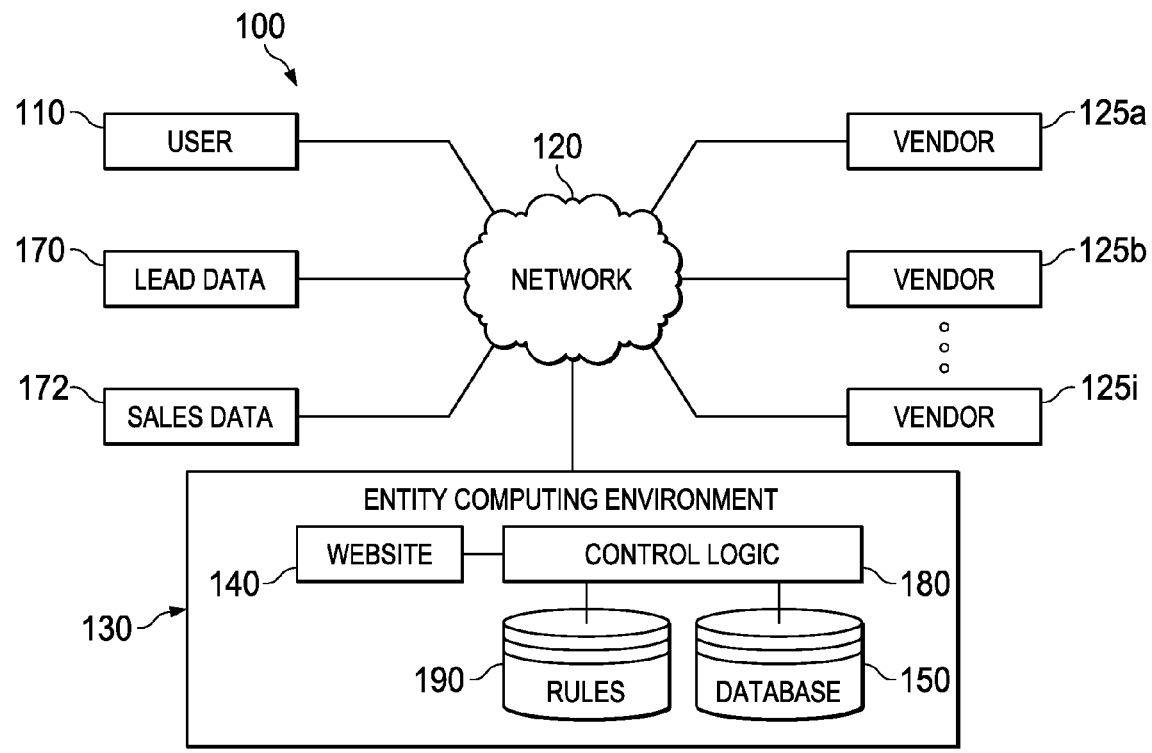
FIG. 1 depicts a diagrammatic representation of an example system for sales and lead matching according to an embodiment.

Turning now to FIG. 1 which depicts a diagrammatic representation of example system 100 comprising entity computing environment or network 130 of an online solution provider. As illustrated in FIG. 1, user 110 may interact (via a client device communicatively connected to one or more servers hosting web site 140) with web site 140 to conduct their product research, and perhaps purchase a new or used vehicle through web site 140. In one embodiment, the user's car buying process may begin when the user directs a browser application running on the user's computer to send a request over a network connection (e.g., via network 120) to web site 140. The user's request may be processed through control logic 180 coupled to web site 140 within entity computing environment 130.

An example of the user's computer or client device can include a central processing unit ("CPU"), a read-only memory ("ROM"), a random access memory ("RAM"), a hard drive ("HD") or storage memory, and input/output device(s) ("I/O"). I/O can include a keyboard, monitor, printer, and/or electronic pointing device. Example of an I/O may include mouse, trackball, stylus, or the like. Further, examples of a suitable client device can include a desktop computer, a laptop computer, a personal digital assistant, a cellular phone, or nearly any device capable of communicating over a network.

Entity computer environment 130 may be a server having hardware components such as a CPU, ROM, RAM, HD, and I/O. Portions of the methods described herein may be implemented in suitable software code that may reside within ROM, RAM, HD, database 150, model(s) 190 or a combination thereof. In some embodiments, computer instructions implementing an embodiment disclosed herein may be stored on a digital access storage device array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by a CPU to perform an embodiment of a method disclosed herein.

In an illustrative embodiment, the computer instructions may be lines of compiled $C^{++}$, Java, or other language code. Other architectures may be used. For example, the functions of control logic 180 may be distributed and performed by multiple computers in enterprise computing environment 130. Accordingly, each of the computer-readable storage media storing computer instructions implementing an embodiment disclosed herein may reside on or accessible by one or more computers in enterprise computing environment 130. The various software components and subcomponents, including web site 140, database 150, control logic 180, and model(s) 190, may reside on a single server computer or on any combination of separate server computers. In some embodiments, some or all of the software components may reside on the same server computer.

In some embodiments, control logic 180 may be capable of determining a match between a lead and a sale of a vendor 125i selling a product to a customer and the customer buying the product from a specific vendor 125i. In some embodiments, data about leads may be received from the user 110 via the website 140, as well as lead data 170 from one or more third party sources. In some embodiments, information about sales may be received from vendors 125i as well as one or more third party sources 172. In some embodiments, information about dealers and vendors 125i known to control logic 180 may be stored on database 150 which is accessible by control logic 180 as shown in FIG. 1.

Control logic 180 can be configured to filter, select, and present matches between leads and sales using one or more rules 190. Rules(s) 190 may be based in part on information about leads stored in database 150 and information about sales stored in database 150.

Figure 2:
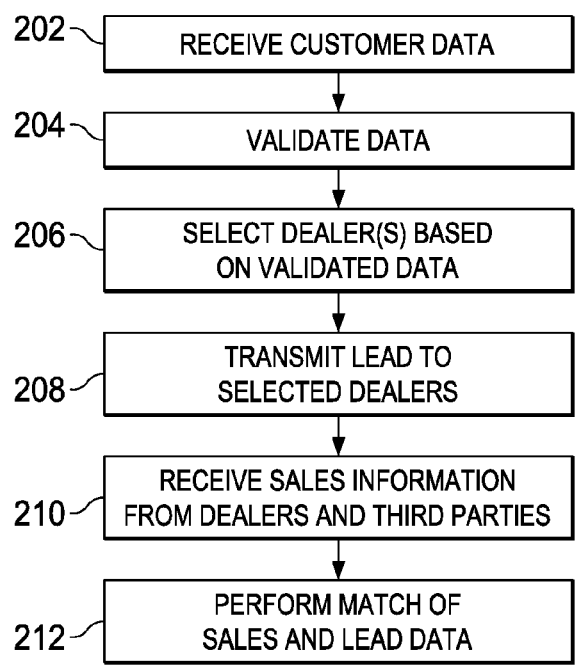
FIG. 2 is a flowchart depicting operation of an embodiment.

Turning now to FIG. 2, one embodiment of a method for matching sales and leads is depicted. At step 202, lead data are collected, for example, by a computer in entity computer environment 130 into database 150. In one embodiment, database 150 may implement a lead database such as a vehicle sales lead data database. As noted above, such lead data may include user supplied information received via web site 140, as well as additional lead data supplied from third parties. Such third party customer data may be appended to customer data received from user input at web site 140. Lead data may additionally include one or more tags tracking user navigation of the web site 140. This is further explained below.

A user visiting web site 140 may be required to provide some basic customer data such as first name, last name, home address, phone number, and/or email address. In one embodiment, the user (a potential customer) may be required to fill out this customer data before the dealer information can be displayed to the user via web site 140.

At step 204, customer data may be validated. Validation of customer data may be desired because users may not enter valid customer data in a registration form for a lead and false information cannot be used to follow up on a lead or match sale. To mitigate this issue, the system may employ a validation sever internal or external to entity computer environment 130 or data validation services to help identify fake and/or incorrect customer data. These services may provide household data associated with the user and the system can append such additional data to the customer data, which can be later used in a sales matching process. This validation process can happen in real-time or in an offline process. The customer data, validated and/or appended data, and other information such as the traffic source and user behavior may be stored in a lead database.

In addition, data input by a user visiting web site 140 may be checked for accuracy or converted into a standard format. For example, honorifics may be deleted or converted into a standard form. Additionally, addresses and telephone numbers may be checked for accuracy, and names associated therewith may be standardized against names provided by the user.

At step 206, one or more vendors may be selected based on the lead data. The system may implement a Dealer Scoring Algorithm (DSA) which utilizes the customer data to select dealers that are most likely to yield a sale in a network associated with an entity. An example DSA that can route lead(s) to dealers is described in U.S. patent application Ser. No. 13/534,930, filed Jun. 27, 2012, entitled "METHOD AND SYSTEM FOR SELECTION, FILTERING OR PRESENTATION OF AVAILABLE SALES OUTLETS," which is fully incorporated herein by reference in its entirety. One goal of the DSA is to increase the likelihood of closing a sale for each prospect, thereby maximizing the revenue for the entity.

The results (selected/top dealers) from the DSA may be shown to a user visiting web site 140 and the user can choose to submit the information for a given search to one or more of the dealers displayed to the user. Every user search can be tagged and recorded. The records may help the system understand the performance of the dealers and may help in further optimizing the DSA.

At step 208, the lead data may be supplied to the selected vendors. At step 210, sales information is received from vendors and third parties. Over time (e.g., within a predetermined time period), the system may receive transaction records from dealers which contain information on the transactions that occurred in their dealerships. These records may contain customer data and data associated with each sale of a vehicle. This data is then stored in a sales database. Third parties may include insurance providers, financing providers, and the like.

At step 212, the received sales data and the lead data are compared to find a match between the leads and sales to identify if the occurrence of a sale is associated with a lead. Matched sales and leads may be approved and invoiced to each dealer. If a dealer feels a sale has been invoiced in error, they can file a dispute which is then reviewed manually.

Figure 3:
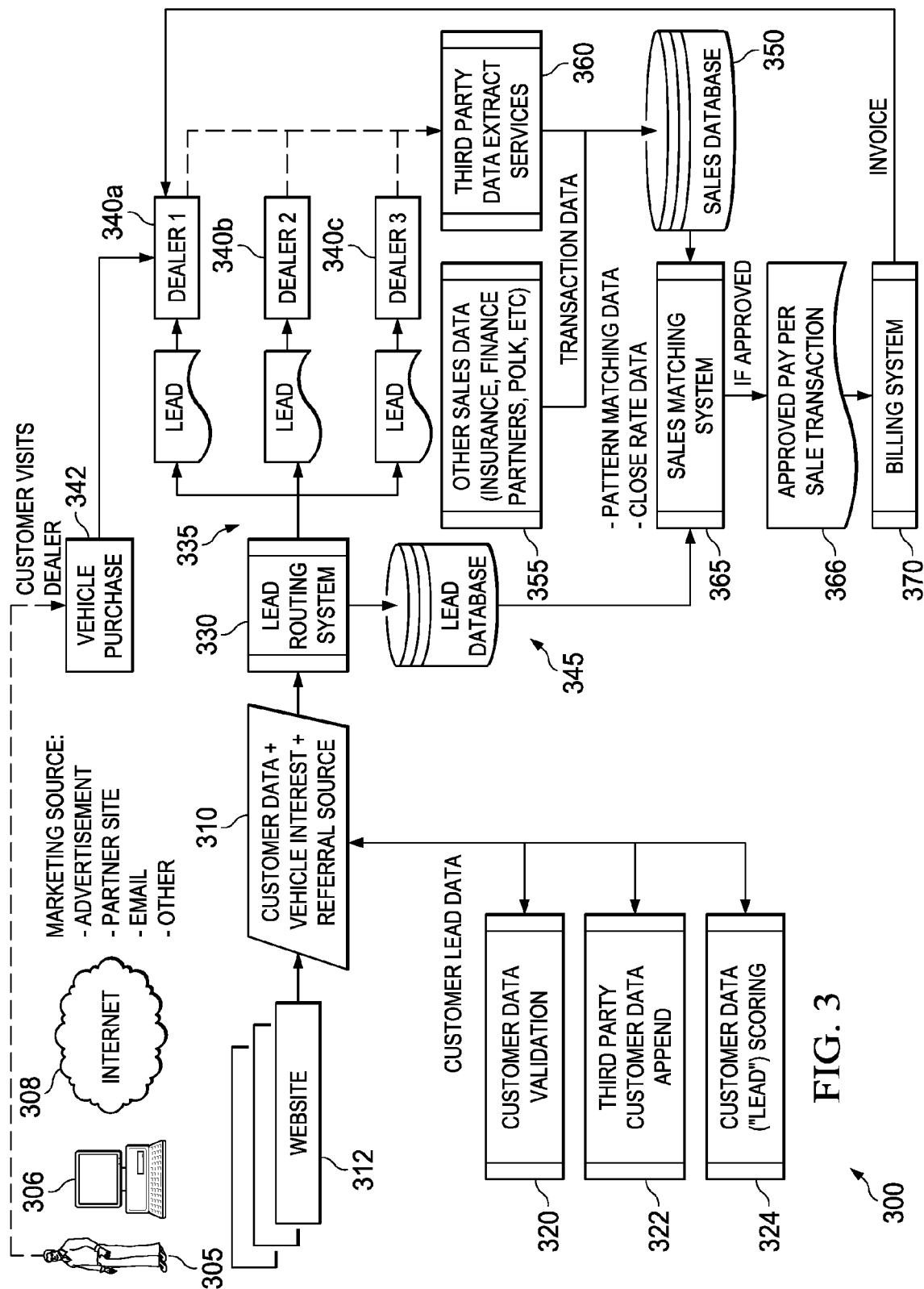
FIG. 3 depicts a diagrammatic representation of an example sales matching system according to an embodiment.

Turning now to FIG. 3 which depicts a diagrammatic representation of example system 300 residing in an entity computing environment. In one embodiment, system 300 may include website 312 hosted on one or more server machines operating in the entity computing environment.

User 305 may interact (via client device 306 communicatively connected to one or more servers in the entity computing environment) with website 312 to research an item. In this disclosure, an item can be a product or a service. In one embodiment, a product may be a vehicle.

User 305 may enter website 312 through various sources 308 on the internet. Example sources may include online advertisements, partner sites, emails, search engines, online directories, etc.

In one embodiment, system 300 may track referral identification such as a uniform resource locator (URL) associated with source 308 from where user 305 entered website 312. System 300 may track source 308 to determine sales revenue associated with a sale. In this way, system 300 can optimize marketing investments across different sources 308. When user 305 enters website 312, system 300 may track and record source 308 of the traffic along with a corresponding timestamp indicating a data/time when user 305 entered website 312.

System 300 may also track and tag user 305 activities and information associated therewith throughout website 312, such as a product or service selected or viewed by user 305 on a page of website 312. In one embodiment, user 305 at client device 306 may use an interface of website 312 to specify customer data about user 305, such a name, address, phone number, email address, etc. User 305 may also specify information about a desired product. For example, user 305 may specify a set of vehicle attributes including make, model, trim, color, power trains, options, etc. In one embodiment, if user 305 changes any attribute of the desired product while on website 312, system 300 may tag the attribute change. System 300 may also determine and track what prices for the desired product are displayed on website 312 to user 305 at client device 306.

Accordingly, system 300 can capture various pieces of information associated with user 305 activities on website 312. The captured information, referred to as customer lead data 310, can be used to generate a lead. System 300 may use these pieces of data to determine what dealers are best matches for user 305 and submit corresponding leads to those dealers.

System 300 may communicate customer lead data 310 in real time or offline to third party service providers such as Acxiom, Service Objects, Melissa Data, Quality Assurance System (QAS), TargusInfo, NeuStar, etc. to determine if the customer data is valid (step 320), append the customer data with additional information (step 322), and score the customer data (step 324).

To determine if the customer data is valid, the customer data that user 305 entered about himself is compared with known formats for names, honorifics, email addresses, phone numbers, IP addresses, etc. If the user provided information is incomplete, incorrect or indeterminate, it may be determined that the customer data is not valid. In such cases, a lead may not be sent to a dealer.

Various criteria may be used to determine whether a lead is valid. For example, in some embodiments, such criteria may include determination of whether one or more of the data are duplicates; whether the submitted phone number matches a phone number previously determined to be invalid; whether the first, last, or full names match names previously determined to be invalid; whether the first, last, or full names match other criteria (as shown, for example, below); and whether the street address matches an address previously determined to be invalid.

More particularly, according to an embodiment, the validation process will flag any of the conditions below as an 'Invalid' lead, which is not sent to dealers nor used for sales matching:

Remove Duplicates: Leads where either of the conditions below match any other leads submitted within seven days:
  a. Same [Vehicle, Dealer and Customer Email Address] or
  b. Same [Vehicle Make, Dealer, Customer Phone Number, and Customer Last Name]

Phone Validation: Leads where phone matches previous Invalid files

First Name/Last Name:
  a. Leads where First Name or Last Name match previous Invalid files
  b. Leads where First Name or Last name contain either Six consecutive consonants, or Three consecutive periods ('.') or dashes ('-')

Full Name:
  a. Leads where [First Name+Last Name] matches previous Invalid files
  b. Leads where length of full name [First Name+Last Name] is less than five characters ("Jo Al" fails, "Bob Jo" succeeds)

Street Address: Leads where address field matches a record in previous Invalid files If the customer data is valid, system 300 may append the customer data, the traffic source, and information associated with the user's activities on website 312 along with further information from the external data sources. In one embodiment, the appended data may include a credit score, annual income, location, family size, and/or any additional information associated with user 305.

An example of user entered data vs. appended data is shown in the table below:

| User Entered Data | |
| --- | --- |
| User Name: | Bob Smith |
| User Address: | 123 Main Street, Santa Monica CA, 90201 |
| User Phone: | |
| Appended Data | |
| Name_basedOnAddress | Smith, Bob J |
| Name_basedOnPhone | Smith, Bob J |
| City_basedOnAddress | Santa Monica |
| City_basedOnPhone | Santa Monica |
| State_basedOnAddress | CA |
| State_basedOnPhone | CA |
| Street_basedOnAddress | 123 Main Street |
| Street_basedOnPhone | 123 Main Street |
| Zip_basedOnAddress | 90401 |
| Zip_basedOnPhone | 90401 |
| Is Wireless Phone | Yes |
| QualityScore | 4 |
| Phone Verify | U |
| Phone Type | Wireless |
| Listing Type | C |
| Valid Address | Y |
| Valid Phone | Y |
| Phone Appears Active | X |
| Do Not Call | N |
| Near Address | X |
| Recent Change | N |
| Phone Provider | VERIZON WIRELESS-NY |
| Address Type | X |

System 300 may determine a lead score for each lead based on the customer data and the appended customer data. The lead score may be used to quantify the value of the lead. In one embodiment, the lead score may be used to remove or vet leads that have a lead score below a threshold because dealers may desire to receive high quality leads. For example, if user 305 was viewing exotic and high priced vehicles on website 312, but user 305 has a low credit rating, then a lead associated with user 305 may have a low score. Accordingly, customer lead data 310 may include valid and appended customer data about a particular user, a desired vehicle configuration user 305 has selected via website 312, referral source(s) from where user 305 enters website 312 and a lead score.

Lead routing system 330 may receive customer lead data 310 and determine which dealers to display user 305. In one embodiment, a DSA may leverage customer lead data 310 to segment users to determine if certain users are more sensitive to different factors such as price, drive distance, colors, etc., and match potential buyers (leads 335) with particular dealers 340a, b, c. The matches are stored in lead database 345 accessible by lead routing system 330.

As an example, lead database 345 may store any characteristics associated with user 305, a desired vehicle configuration specified by user 305, and information regarding user 305 activities on website 312 and any information associated with user 305 that may assist in a performance analysis or determining if lead 335 associated with user 305 is associated with vehicle purchase 342. In one embodiment, lead database 345 may include information associated with user 305 at the household level such as other people's names in a household with user 305 that could be shopping on behalf of user 305.

For example, shown in FIG. 4 is example Lead Data, Sale Data, and Partner Data. Lead Data is data that is collected, for example, via the web site. Sale data is data from the dealer concerning a sale. Partner Data is data from third party sources, such as insurance or financing providers. Embodiments may match the Partner Data with the Lead Data to determine that the lead is generated from the same household. For example, a match of names, phone, make/model and dealership may be enough to infer that there is a household match. In such cases, in some embodiments, the Lead Data and Partner Data are assigned a Partner Identifier (ID) uniquely identifying the household.

In addition, once Sale Data are obtained, Partner Data and Lead Data may be matched with the Sale Data to determine that the sale should be assigned to the household. For example, a match of home address, email, date, make/model, and Partner ID may be sufficient to infer that the sale resulted from the lead associated with the Partner ID.

In one embodiment, lead routing system 330 may determine that user 305 only viewed vehicles of a specific color on website 312, and therefore determine that user 305 is sensitive to the color of the vehicle. In one embodiment, lead routing system 330 may leverage historical data associated with customer lead data 310 such as credit scores, income, address, etc. to determine the best dealers to communicate a lead to. As an example, leads 335 associated with user 305 may be communicated to dealers 340a-c with the highest dealer score with respect to user 305 for a particular vehicle configuration presented on website 312.

In one embodiment, lead 335 may include user information in auto lead format (ADF) comprising contact information of user 305, vehicle information of a desired vehicle for user 305, the lead score and analysis of why the lead was scored that way, information associated with the user's activities on website 312, and any additional comments. In one embodiment, lead 335 may include a link to a dealer portal on website 312 through which dealers 340a-c can access more information about lead 335. Lead 335 may also be placed into a lead management system (not shown) associated with a dealer.

At a later point in time, user 305 may visit one of dealers 340a-c and make a vehicle purchase 342.

Sales database 350 may receive (or system 300 may receive and store the transaction data in sales database 350) transaction data from data source 355 associated with a dealer. Data source 355 may manage the dealer's sales, inventory, insurance, finance partners, registration or DMV data files, etc. Example data sources can include any automotive dealership management system (DMS) data provider. Information on DMS data providers could be obtained with a quick web search.

Sales database 350 may also receive information from third party data services 360 that provide sales records. Example third party data services 360 might include IntegraLink, Digital Motorworks Inc., etc. Third party data services 360 may obtain sales information associated with the sale of a vehicle by executing an agent on a computer in a dealer's network and/or via sales data files submitted directly from the dealership to the third party data services.

In one embodiment, sales database 350 may include the following information associated with a sale of a vehicle: basic vehicle information, vehicle identification number (VIN), dealer, year/make/model (Y/M/M) information, new or used information, pricing data such as an invoice or MSRP, inventory fee, sales fee, etc. As a non-limiting example, this data may be received by sales database 350 every night or over any desired time period via ftp from data source 355 and/or third party data services 360. Sales database 350 may also store insurance files from insurances companies, loan origination files from vehicle loan companies, and/or incentive redemption codes from original equipment manufacturers (OEM). Data stored may include VIN, Sale Date, Dealership, Customer Name, Customer Email, Customer Phone, Customer Address, Customer Policy Number, and other attributes related to the customer or vehicle.

In one embodiment, the information within sales database 350 may be validated and appended via a similar process as described above for customer lead data 310 stored in lead database 345. In some embodiments, the insurance files, loan origination files, and/or incentive redemption codes may be validated, appended, and/or scored as described above in steps 320, 322, 324. Output(s) from the process(es) can then be stored in sales database 350.

According to some embodiments, names may be standardized, dealer sales may be filtered, and military ranks may be standardized according to rules such as those set forth below:

Standardize Names:
a. Compare transposed First Name and Last Name fields to Lead Records to identify transposed names. If matched, overwrite sales record First and Last Name in matching database.
b. Identify names with two hyphenated last names or three separate names (First, Last, Other—either hyphenated, non-hyphenated, middle).
c. Compare subsets of names with Lead Records. If matched, overwrite sales record First and Last name in matching database.
d. Remove 'Jr', 'Sr', 'II', 'III', 'IV' from last names.
e. Remove any 'empty strings' possibly created in data processing/queries.
f. Remove any email records that match previously-determined Invalid values.

Filter Dealer Sales: Sales records where First Name or Last Name is blank, or where record types indicate Dealer Sale, Trade, or Trade-In.

Standardize military rank: Isolate and standardize known military rank abbreviations.

Sales matching system 365 may determine a matching score identifying if one of dealers 340a-c sold a vehicle to user 305 as a result of user 105 visiting website 312.

Example embodiments of sales matching system 365 can be found in U.S. patent application Ser. No. 11/968,137, filed Dec. 31, 2007, entitled "SYSTEMS AND METHODS OF MATCHING PURCHASE REQUESTS WITH CONSUMMATED SALES," which is fully incorporated herein by reference in its entirety. Sales matching system 365 may determine if user 305 purchased a vehicle from a particular dealer by matching the information about user 305 in lead database 345 with information about vehicle purchase 342 in sales database 350, such as name, phone number, VIN, etc.

The customer information may be used to determine if a lead is associated with a sale of a product, even if the product was not the same product inquired by user 305 on website 312. For example, if user 105 prints out from website 312 a certificate associated with a particular vehicle configuration from a dealer but purchased a different vehicle from the dealer, system 300 may use customer lead data 310 to determine that the sale was associated with user 305 activities on website 312, and that the sale is likely resulted from such activities.

In one embodiment, sales matching system 365 may determine vehicle purchase 342 is related to lead 335 by analyzing similarities between the information in lead database 345 and sales database 350, such as a Levenshtein distance determining how closely related is the spelling of the name of user 305 in lead database 345 with the name of a buyer associated with vehicle purchase 342 in sales database 350, addresses with different variations, types of homes specified, uniqueness of the name of user 305, etc., and producing a corresponding matching score.

Sales matching system 365 may utilize a first threshold where, if the matching score is greater than the first threshold, it may be determined that there is a match between a sale and a lead. If the score is below that threshold, it may be determined that a manual review is necessary. In some embodiments, sales matching system 365 may also utilize a second threshold, where if the matching score is greater than the first threshold but less than the second threshold, then a manual review may be desired to determine if a sale is indeed associated with a lead. In one embodiment, if the match score is less than the second threshold it may be determine that there is not a match between a lead and a sale.

Shown in FIG. 5, for example, is a list of example match criteria and example match scores. In the example illustrated, if the cumulative confidence is greater than 100, the lead is automatically approved. In some embodiments, the cumulative confidence is the sum of the individual confidence scores.

FIG. 6 illustrates this more particularly. As shown, Examples A and B matched on attributes with cumulative scores of greater than 100 and so would be auto-approved. Examples C and D, however, would be provided for manual review. Typically, the example with the higher score would be processed first.

If it is determined that a sale is associated with a lead, either manually or automatically, sales matching system 365 may approve (step 366) the lead for a pay-per-sale transaction. In one embodiment, one or more additional rules may be applied to the sale to determine the pay-per-sale price.

These may include one or more business rules associated with, for example, past transactions, geographic areas, and the like.

Upon approving a sale, billing system 370 may invoice the dealer that completed the sale. The invoice may include information identifying vehicle purchase 342 and lead 335.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. The processes described herein may be implemented in suitable computer-executable instructions that may reside on a non-transitory computer readable medium (for example, ROM, RAM, and HD, etc.), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a memory, a disk, a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software embodied on hardware, firmware or any combination thereof.

Embodiments described herein can be implemented in the form of control logic in hardware or a combination of software and hardware. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components, and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "computer" or "processor" may include any hardware system, mechanism or component that processes data, signals or other information. A computer or processor can include a system with a central processing unit, multiple processing units, dedicated circuitry for achieving functionality, or other systems. Processing need not be limited to a geographic location, or have temporal limitations. For example, a computer or processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A method, comprising:
  receiving user-provided customer data from a user device, the receiving performed by a server computer via a website on the Internet, the server computer communicatively connected to a validation sever;
  communicating the user-provided customer data from the server computer to the validation sever;
  receiving, by the server computer, a response from the validation sever;
  based on the response from the validation sever, determining, in real time and while the user is browsing the website, whether the user-provided customer data is valid customer data, the determining performed by the server computer;
  responsive to the user-provided customer data being determined by the server computer as valid customer data, generating appended data associated with the user, the generating performed by the server computer;
  subsequent to generating the appended data associated with the user, generating, by the server computer, customer lead data associated with the user, the customer lead data including the valid customer data determined by the server computer, the appended data generated by the server computer, and a desired product, service, or vehicle configuration that the user has selected through the website;

based at least in part on the customer lead data associated with the user, selecting, by the server computer, at least one dealer from a plurality of dealers affiliated with the website;

presenting the at least one dealer within the website on the user device while the user is still browsing the website;

automatically tracking and storing, in a database by the server computer, user activities relating to vehicle research by the user on the website while the at least one dealer is presented within the website on the user device, the user activities stored in the database including at least one of: at least one search query submitted by the user to the website, navigation of the website by the user, a product or service selected or viewed by the user, or any changes in desired vehicle attributes made by the user;

communicating the customer lead data associated with the user from the server computer to a computing device associated with the at least one dealer;

receiving, by the server computer, sales data from the at least one dealer, the sales data including information on sales of vehicles by the at least one dealer;

matching, by the server computer applying a matching rule, the sales of vehicles by the at least one dealer and the user activities stored in the database relating to the vehicle research by the user on the website while the at least one dealer is presented within the website on the user device; and responsive to a match being found between a vehicle sale by a dealer of the at least one dealer and the user activities stored in the database relating to the vehicle research by the user on the website while the at least one dealer is presented within the website on the user device, generating, by the server computer, an output linking the customer lead data, which is associated with the user and which is generated by the server computer, with the vehicle sale by the dealer of the at least one dealer.

2. The method according to claim 1, further comprising:
determining, from the user-provided customer data, a name associated with an address or phone number; and
comparing the name associated with the address or phone number with a name in the user-provided customer data.

3. The method according to claim 2, further comprising:
prior to the comparing, converting both the name in the user-provided customer data and the name determined from the user-provided customer data into a standard format.

4. The method according to claim 1, wherein the server computer determines the sales of vehicles by the at least one dealer based on the sales data received from the at least one dealer and sales data received from a third-party source pertaining to the sales of vehicles by the at least one dealer.

5. The method according to claim 1, further comprising:
comparing the user-provided customer data with previously determined invalid customer data; and
responsive to the user-provided customer data being determined by the server computer as not valid customer data, updating the previously determined invalid customer data to include the user-provided customer data.

6. The method according to claim 1, wherein the user-provided customer data is stored in a table associated with the user, wherein the generating the appended data associated with the user further comprises obtaining, using the valid customer data, information associated with the user from external data sources, creating new entries based on the information obtained from the external data sources, and adding the new entries to the table associated with the user as the appended data associated with the user.

7. The method according to claim 1, further comprising:
generating an invoice for the dealer based on the output linking the customer lead data with the vehicle sale by the dealer, the invoice containing information identifying the dealer, the vehicle sale by the dealer, and the user.

8. A system, comprising:
a website server hosting a website on the Internet; and
a server computer communicatively connected to the website server, the server computer comprising a processor, a non-transitory computer readable medium, and stored instructions translatable by the processor for:
receiving user-provided customer data from a user device through the website on the Internet;
communicating the user-provided customer data from the server computer to a validation sever;
receiving a response from the validation sever;
based on the response from the validation sever, determining, in real time and while the user is browsing the website, whether the user-provided customer data is valid customer data;
responsive to the user-provided customer data being determined as valid customer data, generating appended data associated with the user;
subsequent to generating the appended data associated with the user, generating customer lead data associated with the user, the customer lead data including the valid customer data determined by the server computer, the appended data generated by the server computer, and a desired product, service, or vehicle configuration that the user has selected through the website;
based at least in part on the customer lead data associated with the user, selecting at least one dealer from a plurality of dealers affiliated with the website;
presenting the at least one dealer within the website on the user device while the user is still browsing the website;
automatically tracking and storing, in a database, user activities relating to vehicle research by the user on the website while the at least one dealer is presented within the website on the user device, the user activities stored in the database including at least one of: at least one search query submitted by the user to the website, navigation of the website by the user, a product or service selected or viewed by the user, or any changes in desired vehicle attributes made by the user;
communicating the customer lead data associated with the user from the server computer to a computing device associated with the at least one dealer;
receiving sales data from the at least one dealer, the sales data including information on sales of vehicles by the at least one dealer;
matching, by applying a matching rule, the sales of vehicles by the at least one dealer and the user activities stored in the database relating to the vehicle research by the user on the website while the at least one dealer is presented within the website on the user device; and
responsive to a match being found between a vehicle sale by a dealer of the at least one dealer and the user activities stored in the database relating to the vehicle research by the user on the website while the at least one dealer is presented within the website on the user device, generating an output linking the customer lead data, which is associated with the user and which is generated by the server computer, with the vehicle sale by the dealer.

9. The system of claim 8, wherein the instructions are further translatable by the processor for:
determining, from the user-provided customer data, a name associated with an address or phone number; and
comparing the name associated with the address or phone number with a name in the user-provided customer data.

10. The system of claim 9, wherein the instructions are further translatable by the processor for:
prior to the comparing, converting both the name in the user-provided customer data and the name determined from the user-provided customer data into a standard format.

11. The system of claim 8, wherein the server computer determines the sales of vehicles by the at least one dealer based on the sales data received from the at least one dealer and sales data received from a third-party source pertaining to the sales of vehicles by the at least one dealer.

12. The system of claim 8, wherein the instructions are further translatable by the processor for:
comparing the user-provided customer data with previously determined invalid customer data; and
responsive to the user-provided customer data being determined as not valid customer data, updating the previously determined invalid customer data to include the user-provided customer data.

13. The system of claim 8, wherein the user-provided customer data is stored in a table associated with the user, wherein the generating the appended data associated with the user further comprises obtaining, using the valid customer data, information associated with the user from external data sources, creating new entries based on the information obtained from the external data sources, and adding the new entries to the table associated with the user as the appended data associated with the user.

14. The system of claim 8, wherein the instructions are further translatable by the processor for:
generating an invoice for the dealer based on the output linking the customer lead data with the vehicle sale by the dealer, the invoice containing information identifying the dealer, the vehicle sale by the dealer, and the user.

15. A computer program product comprising a non-transitory computer readable medium storing instructions translatable by a server computer for:
receiving user-provided customer data from a user device through a website on the Internet;
communicating the user-provided customer data from the server computer to a validation sever;
receiving a response from the validation sever;
based on the response from the validation sever, determining, in real time and while the user is browsing the website, whether the user-provided customer data is valid customer data;
responsive to the user-provided customer data being determined as valid customer data, generating appended data associated with the user;
subsequent to generating the appended data associated with the user, generating customer lead data associated with the user, the customer lead data including the valid customer data determined by the server computer, the appended data generated by the server computer, and a desired product, service, or vehicle configuration that the user has selected through the website;
based at least in part on the customer lead data associated with the user, selecting at least one dealer from a plurality of dealers affiliated with the website;
presenting the at least one dealer within the website on the user device while the user is still browsing the website;
automatically tracking and storing, in a database, user activities relating to vehicle research by the user on the website while the at least one dealer is presented within the website on the user device, the user activities stored in the database including at least one of: at least one search query submitted by the user to the website, navigation of the website by the user, a product or service selected or viewed by the user, or any changes in desired vehicle attributes made by the user;
communicating the customer lead data associated with the user from the server computer to a computing device associated with the at least one dealer;
receiving sales data from the at least one dealer, the sales data including information on sales of vehicles by the at least one dealer;
matching, by applying a matching rule, the sales of vehicles by the at least one dealer and the user activities stored in the database relating to the vehicle research by the user on the website while the at least one dealer is presented within the website on the user device; and
responsive to a match being found between a vehicle sale by a dealer of the at least one dealer and the user activities stored in the database relating to the vehicle research by the user on the website while the at least one dealer is presented within the website on the user device, generating an output linking the customer lead data, which is associated with the user and which is generated by the server computer, with the vehicle sale by the dealer.

16. The computer program product of claim 15, wherein the instructions are further translatable by the processor for:
determining, from the user-provided customer data, a name associated with an address or phone number; and
comparing the name associated with the address or phone number with a name in the user-provided customer data.

17. The computer program product of claim 16, wherein the instructions are further translatable by the processor for:
prior to the comparing, converting both the name in the user-provided customer data and the name determined from the user-provided customer data into a standard format.

18. The computer program product of claim 15, wherein the instructions are further translatable by the processor for:
comparing the user-provided customer data with previously determined invalid customer data; and
responsive to the user-provided customer data being determined by the server computer as not valid customer data, updating the previously determined invalid customer data to include the user-provided customer data.

19. The computer program product of claim 15, wherein the user-provided customer data is stored in a table associated with the user, wherein the generating the appended data associated with the user further comprises obtaining, using the valid customer data, information associated with the user from external data sources, creating new entries based on the information obtained from the external data sources, and adding the new entries to the table associated with the user as the appended data associated with the user.

20. The computer program product of claim 15, wherein the instructions are further translatable by the processor for:
generating an invoice for the dealer based on the output linking the customer lead data with the vehicle sale by the dealer, the invoice containing information identifying the dealer, the vehicle sale by the dealer, and the user.

* * * * *